United States Patent
Gumpoltsberger et al.

(10) Patent No.: US 7,272,985 B2
(45) Date of Patent: Sep. 25, 2007

(54) TRANSMISSION DEVICE OF LAYSHAFT TYPE

(75) Inventors: Gerhard Gumpoltsberger, Friedrichshafen (DE); Jens Patzner, Potsdam (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 72 days.

(21) Appl. No.: 11/220,516

(22) Filed: Sep. 7, 2005

(65) Prior Publication Data

US 2006/0048594 A1   Mar. 9, 2006

(30) Foreign Application Priority Data

Sep. 8, 2004  (DE) .................. 10 2004 043 386

(51) Int. Cl.
*F16H 3/08* (2006.01)
(52) U.S. Cl. ....................................... 74/331
(58) Field of Classification Search ............. 74/330, 74/331; 192/3.27, 48.1
See application file for complete search history.

(56) References Cited

U.S. PATENT DOCUMENTS

| | | | |
|---|---|---|---|
| 4,727,764 A * | 3/1988 | Klaue | 74/331 |
| 7,044,013 B2 * | 5/2006 | Ahrens | 74/331 |
| 7,147,095 B2 * | 12/2006 | Kraxner et al. | 192/87.15 |
| 2006/0048593 A1 * | 3/2006 | Gumpoltsberger et al. | 74/325 |

FOREIGN PATENT DOCUMENTS

DE   43 30 170 A1   3/1995

* cited by examiner

*Primary Examiner*—Dirk Wright
(74) *Attorney, Agent, or Firm*—Davis Bujold & Daniels, P.L.L.C.

(57) ABSTRACT

A countershaft-type transmission device has an input central shaft and an input hollow shaft and two powershift elements. One first half of the powershift elements is in connection with one drive unit and a second half of the powershift elements is connected with the input central shaft or the input hollow shaft. The input central shaft, the input hollow shaft and countershafts are supported in one housing and connected with gear wheels, which are engaged with each other by pairs and can be connected and disconnected to produce a transmission total ratio in the power flow. The input central shaft is supported in the housing via a first bearing device and the drive unit is supported via a second bearing device on a shaft connected with a drive unit, the input hollow shaft being supported on the input central shaft via a third bearing device and a fourth bearing device.

11 Claims, 3 Drawing Sheets

TRANSMISSION DEVICE OF LAYSHAFT TYPE

This application claims priority from German Application Serial No. 10 2004 043 386.0 filed Sep. 8, 2004.

FIELD OF THE INVENTION

The invention relates to a transmission device of countershaft type, particularly to a dual clutch transmission, having one input central shaft and concentrical thereto one input hollow shaft.

BACKGROUND OF THE INVENTION

DE 43 30 170 C2 disclosed a six-gear dual clutch transmission designed on the input side with a so-called dual clutch formed by two frictionally coupled shifting elements. In this dual clutch transmission, input torque of a prime mover applied via a motor output shaft, depending on a transmitting capacity adjusted at the time in the shifting elements, is passed to a first central input shaft or to a second input shaft supported on the central input shaft and designed as a hollow shaft. The input central shaft and the input hollow shaft are each non-rotatably connected with one gear wheel which, in turn, meshes with respective gear wheels, each non-rotatably connected with one countershaft. Both countershafts are disposed concentrically to each other, one countershaft designed as a hollow shaft being supported on one other central countershaft.

To produce different gear steps, the six-gear dual clutch transmission is designed with added gear wheel pairs connectable via synchronizer units, the input torque of the prime mover changed according to the total ratio of the transmission adjusted at the moment being relayed via a transmission output shaft disposed coaxially to the transmission input.

The strong toothing forces acting in the area of the gear wheel pairs connected with the input shaft designed as a hollow shaft, hereinafter designated as a transmission input hollow shaft, are introduced in the transmission housing via supports on the housing side. The forces engaging on the input central shaft are introduced in the housing via bearing devices on the housing side of the input central shaft.

This arrangement, however, is disadvantageously distinguished by unfavorable load characteristic values which result in a short service life of the transmission and undesirable with regard to the operation costs of a motor vehicle throughout the service life thereof. Furthermore, supports of wheel sets on the housing side, in general, increase the production costs and the required installation space of a transmission, in addition, making and assembly difficult.

Accordingly, the problem on which this invention is based is to make a transmission device of countershaft type available which, in the area of the bearings of the input shafts, stands out by low load characteristic values, long service life and easy assemblage.

SUMMARY OF THE INVENTION

The inventive transmission device of a countershaft type having one input central shaft and concentrically disposed thereto one input hollow shaft and having two powershift elements in which one first half of the shifting elements is operatively connected with one input unit and one second half of the shifting elements is connected with the input shaft or the input hollow shaft. The input central shaft, the input hollow shaft and countershafts are supported in one housing and operatively connected with gear wheels which, as gear wheel pairs, are engaged with each other in pairs and can be connected and disconnected to produce a transmission total ratio in the power flow, has favorable load characteristic values and a long service life, in turn, resulting therefrom.

This is achieved by the fact that the transmission input central shaft is directly supported in the housing in the area of its end remote from the input unit via a first bearing device and in the area of its second end facing the input unit is supported on the shaft operatively connected with the motor output shaft via a second bearing device; the transmission input hollow shaft being supported directly on the transmission input central shaft via a third bearing device and a fourth bearing device. Thus, in the area of the transmission input shafts, compared to the devices known from the prior art, the inventive solution has less bearings on the housing side and, as result of the inventive bearing device in the area of the transmission input shafts, stands out by low load characteristic values.

The inventive bearing device of the transmission device is further characterized, especially in an axial direction, by requiring a small installation space since, in the area of the input shafts, only a single fixed bearing supported in the housing is provided. Eventual bearing devices for axial force support in the area of the input shaft need, in the axial direction, less space than fixed support on the housing side whereby the installation space needed in the axial direction is reduced when compared to conventionally designed transmission devices.

In the interior of the transmission device, in the peripheral areas of the input hollow shaft, enough space is additionally available to energize both powershift elements with the actuation energy needed for control thereof in the form of hydraulic pressures or in the form of a mechanical control such as a release mechanism.

By the proposed solution, other advantages also result in relation to an assembly of the inventive device since, in the first place, the transmission input central shaft can be mounted in the housing of the transmission device. The input hollow shaft can then be easily shoved and secured on the input central shaft.

The inventive bearing device of the transmission device, in addition, offers advantages regarding the structure of the transmission housing, since the first bearing device and one fixed bearing of a countershaft designed as a central shaft can be positioned in a common bearing plane and can thus be supported in a common bearing plate favorably as to cost and space.

BRIEF DESCRIPTION OF THE DRAWINGS

The invention will now be described, by way of example, with reference to the accompanying drawings. For the sake of clarity, the same reference numerals are used for parts having the same construction and function. The drawings show.

DETAILED DESCRIPTION OF THE INVENTION

Figure 1:
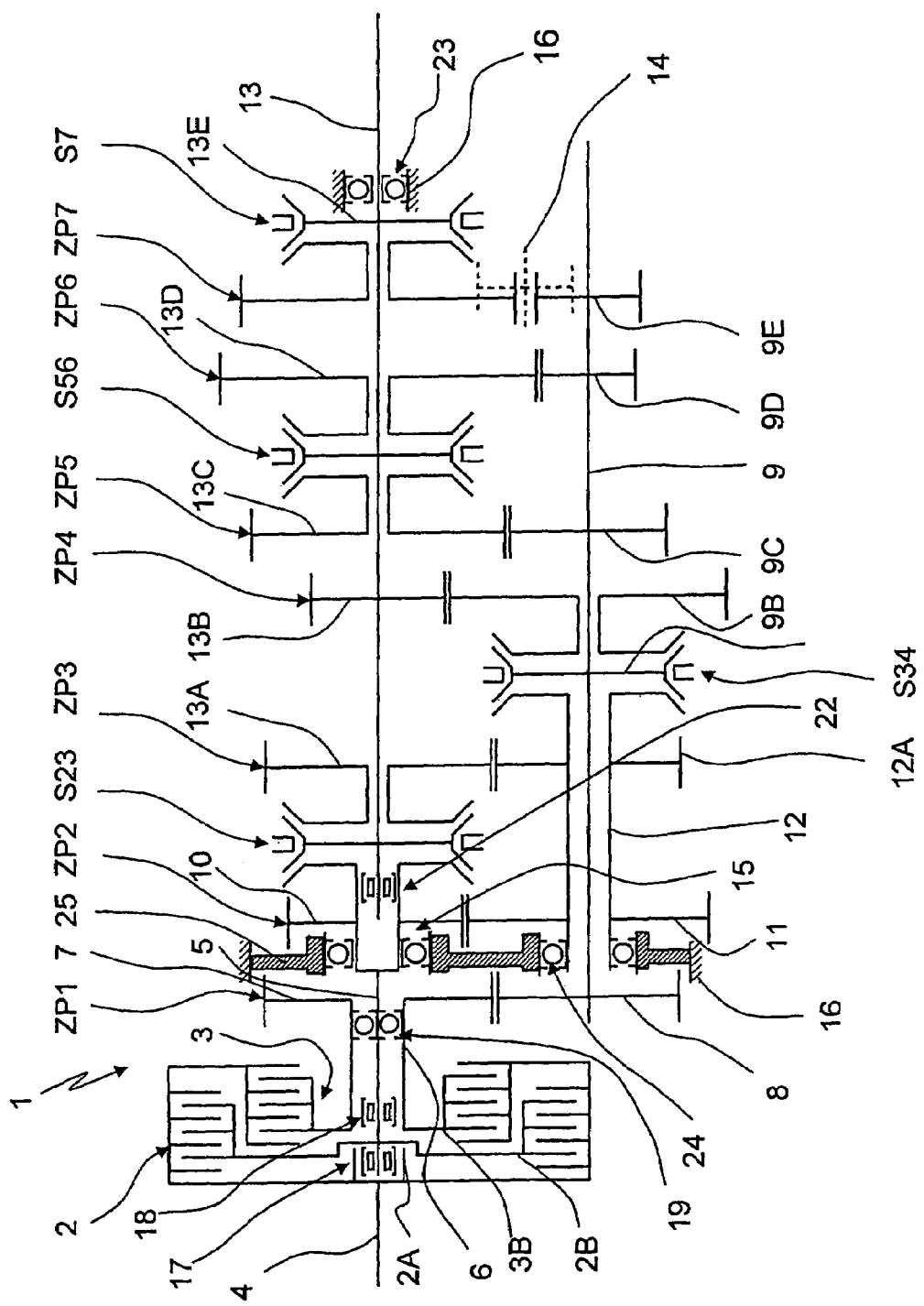
FIG. 1 is a gear diagram of a first embodiment of an inventive transmission device.

FIG. 1 shows one transmission device 1 of a countershaft type designed on the input side with two powershift elements 2, 3 by way of which a torque cropping out via a motor output shaft 4 can optionally be passed to an input central shaft 5 or to a second input shaft 6 disposed concentrically to the input central shaft 5, supported thereon and designed as a hollow shaft.

The second powershift element 3 is situated radially within the first powershift element 2 so that the transmission device 1 designed as a multi-gear transmission or so-called dual clutch transmission has less length in axial direction than in powershift elements disposed side-by-side. The radially nested arrangement of the powershift elements 2, 3 shown in FIG. 1 increase the measurements of the multi-gear transmission 1 on the input in peripheral direction compared to powershift elements disposed side-by-side.

The input hollow shaft 6 is non-rotatably connected with a first gear wheel 7, designed as a spur gear, which meshes with a second gear wheel 8, likewise, designed as a spur gear. The gear wheel 8 is non-rotatably connected with one central countershaft or one central shaft 9 of the countershaft which extends substantially throughout the length of the multi-gear transmission 1.

The transmission input central shaft 5 is non-rotatably connected with a third gear wheel 10 which meshes with a fourth gear wheel 11 non-rotatably connected with a second countershaft designed as a hollow shaft or a hollow shaft 12 of a countershaft mounted on the central shaft 9 of the countershaft.

One transmission output shaft 13 situated coaxial here to the input central shaft 5 and to the motor output shaft 4 carries several gear wheels 13A to 13E which mesh with gear wheels 12A and 9B to 9E of the hollow shaft 12 or the central shaft 9 of the countershaft so that the multi-gear transmission 1 is designed with seven gear wheel pairs ZP1 to ZP7.

To producing the different ratio steps of the multi-gear transmission 1 possible, there are further provided four shifting elements S23, S34, S56 and S7, designed as synchronizer units, which the gear wheel pairs ZP3, ZP4, ZP5, ZP6 and ZP7 can be connected in the power flow of the multi-gear transmission 1 and disconnected therefrom. In addition, the input central shaft 5 and an output shaft 13 of the transmission can be non-rotatably interconnected via the synchronizer unit S23 so that a direct through drive can be produced with the transmission total ratio "1".

In the area of the gear wheel pair ZP7 between the gear wheel 9E non-rotatably connected with the central shaft 9 of the countershaft and the gear wheel 13E designed as an idler wheel and located upon the transmission input shaft 13, is further provided with one other gear wheel 14, shown shaded in FIG. 1, so that when the gear wheel pair ZP7 is connected, a reversal direction of rotation exists on the transmission output shaft 13 and when the multi-gear transmission 1 is introduced in a motor vehicle, a reverse drive step is available.

The transmission input central shaft 5 is supported in a housing 16 of the multi-gear transmission 1 in the area of its end remote from the motor output 4 via a first bearing device 15. The first bearing device 15 is designed as a fixed bearing being able to absorb and support both radial forces and axial forces in the housing 16, acting in direction of the input or of the output of the transmission.

In addition, in the area of its end facing the transmission input, the transmission central shaft 5 is supported via a second bearing device 17 on the motor output shaft 4 or a clutch shaft 2A operatively connected therewith of the first powershift element 2. The second bearing device 17 is designed as an idler bearing which forces engaging essentially only in radial direction on the transmission input central shaft 5 and can be transmitted to the motor output shaft 4 and supported thereon.

The transmission input hollow shaft 6 is supported on the transmission input central shaft 5, via a third bearing device 18 and a fourth bearing device 19. The third bearing device 18, the same as the second bearing device 17, being designed as idler bearings so that via the third bearing device 18 only radial forces engaging on the transmission input hollow shaft 6 can be supported on the transmission input central shaft 5.

A fourth bearing device 19 is designed as the first bearing device 18 as first bearing device 15 so that both radial forces engaging on the transmission input hollow shaft 6 and axial forces engaging thereon can be passed to the transmission input central shaft 5 and is supported, via the first bearing device 15, in the housing 16 of the transmission device 1.

In the embodiment of the transmission device 1, shown in FIG. 1, the first bearing device 15 and the fourth bearing device 19 are designed as grooved ball bearings, double helical ball bearings, four-point bearings, double taper bearings or the like, whereas the second bearing device 17 and the third bearing device 18 can be designed as needle bearings, cylinder roller bearings or the like.

The transmission output shaft 13 is supported in the input central shaft 5 by its end facing the powershift elements 2, 3 via an idler bearing 22 so that in this area gear forces of the gear wheel pairs ZP2 to ZP7 engaging on the transmission output shaft 13 and acting in radial direction can be guided to the transmission central shaft 5 and from there, via the first bearing device 15, to the housing 16 of the transmission device 1. In the area of the end facing of the transmission output, the output shaft 13 is supported via one other fixed bearing 23 in the housing 16 of the transmission device 1 so that forces acting both in radial direction and in axial direction can be supported in the housing 16 of the transmission device 1.

Figure 2:
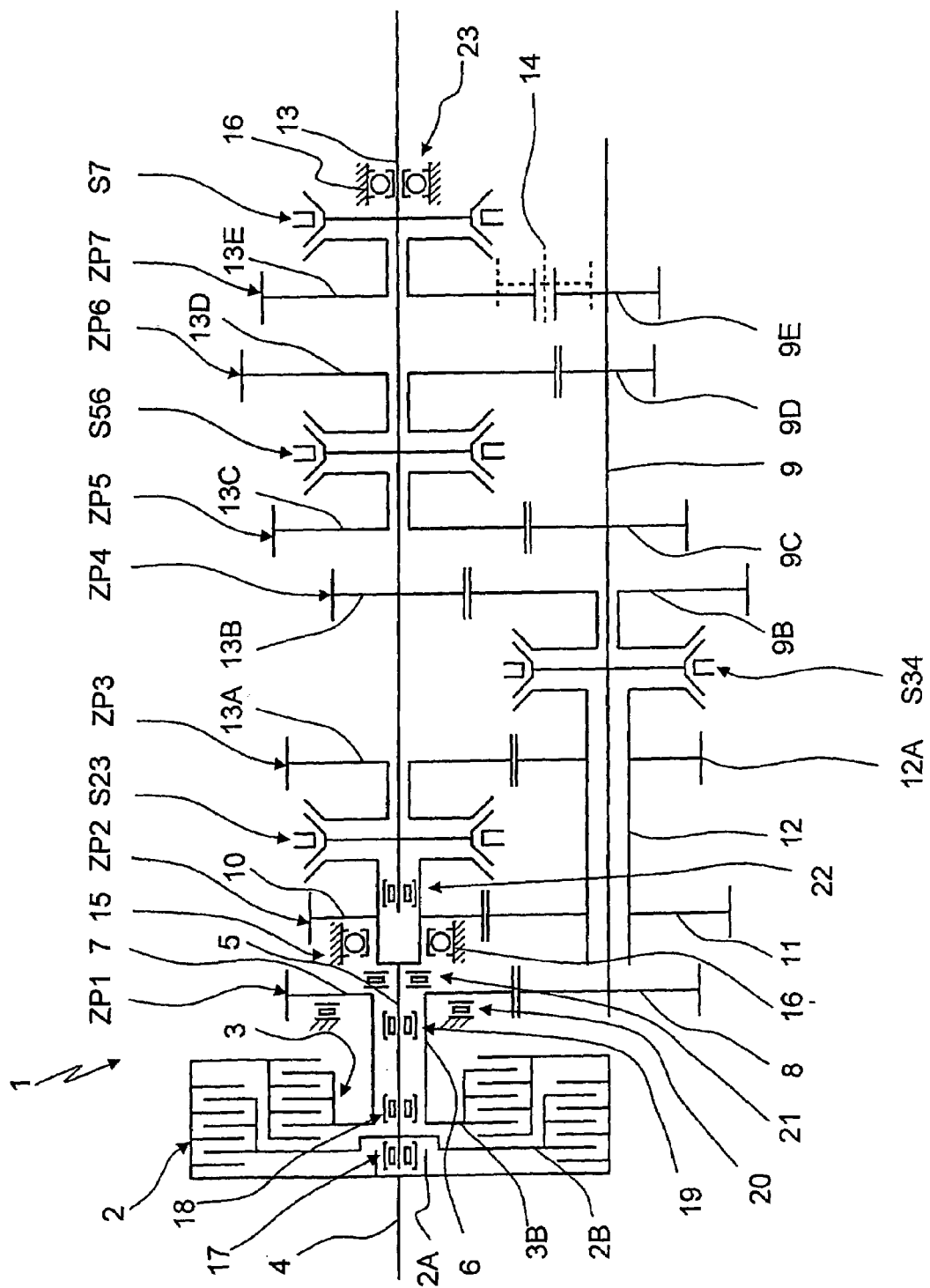
FIG. 2 is a gear diagram of a second embodiment of an inventive transmission device.

In FIG. 2 is shown a second embodiment of an inventively designed transmission device which differs from the embodiment of the multi-gear transmission 1, shown in FIG. 1, only in the area of the gearing devices of the transmission input hollow shaft 6 wherefore, in the description of FIG. 2 that follows, only the differences are discussed.

In the transmission device of the multi-gear transmission 1, shown in FIG. 2, the third bearing device 18 and also the fourth bearing device 19 are designed as idler bearings. Two axial bearing device 20, 21 are additionally provided for support of the axial forces engaging on the transmission input hollow shaft 6 which the axial forces engaging on the transmission input hollow shaft 6 can be passed to the transmission input central shaft 5 or introduced in the housing 16. The axial bearing devices 20 and 21 are here designed as axial grooved ball bearings and in other embodiments of the inventive multi-gear transmission 1 (not shown in detail) can also be designed, depending on the current application, as axial needle bearings or as one helical ball bearing transmitting only axial forces or grooved ball bearings.

At the same time, axial forces acting on the transmission input hollow shaft 6 in direction of the motor output shaft 4 are supported in the transmission housing 16 and axial forces acting in direction of the transmission output shaft 13 are supported via a second axial bearing device 21 optionally in the housing 16 or on the transmission input central shaft 5.

Alternative to this, it is also possible to situate a first axial bearing device 20 in the area between the two inner disc carriers 2B, 3B of the powershift elements 2, 3 firmly connected respectively with the transmission input central shaft 5 and with the transmission input hollow shaft 6 so as to make possible passing the axial forces engaging on the transmission input hollow shaft 6 in direction of the motor output shaft 4 to the transmission input central shaft 5 via the first axial bearing device 20 and from there into the housing 16 via the first bearing device 15.

In the transmission device 1, shown in FIG. 2, where the first axial bearing device 20 is supported in the housing 16, said housing 16 is designed in the area of the first axial bearing device 20 in space-saving manner with the addition of an oil and pressure supply unit for the powershift elements 2, 3 (not shown in detail) and integrated in the housing.

Figure 3:
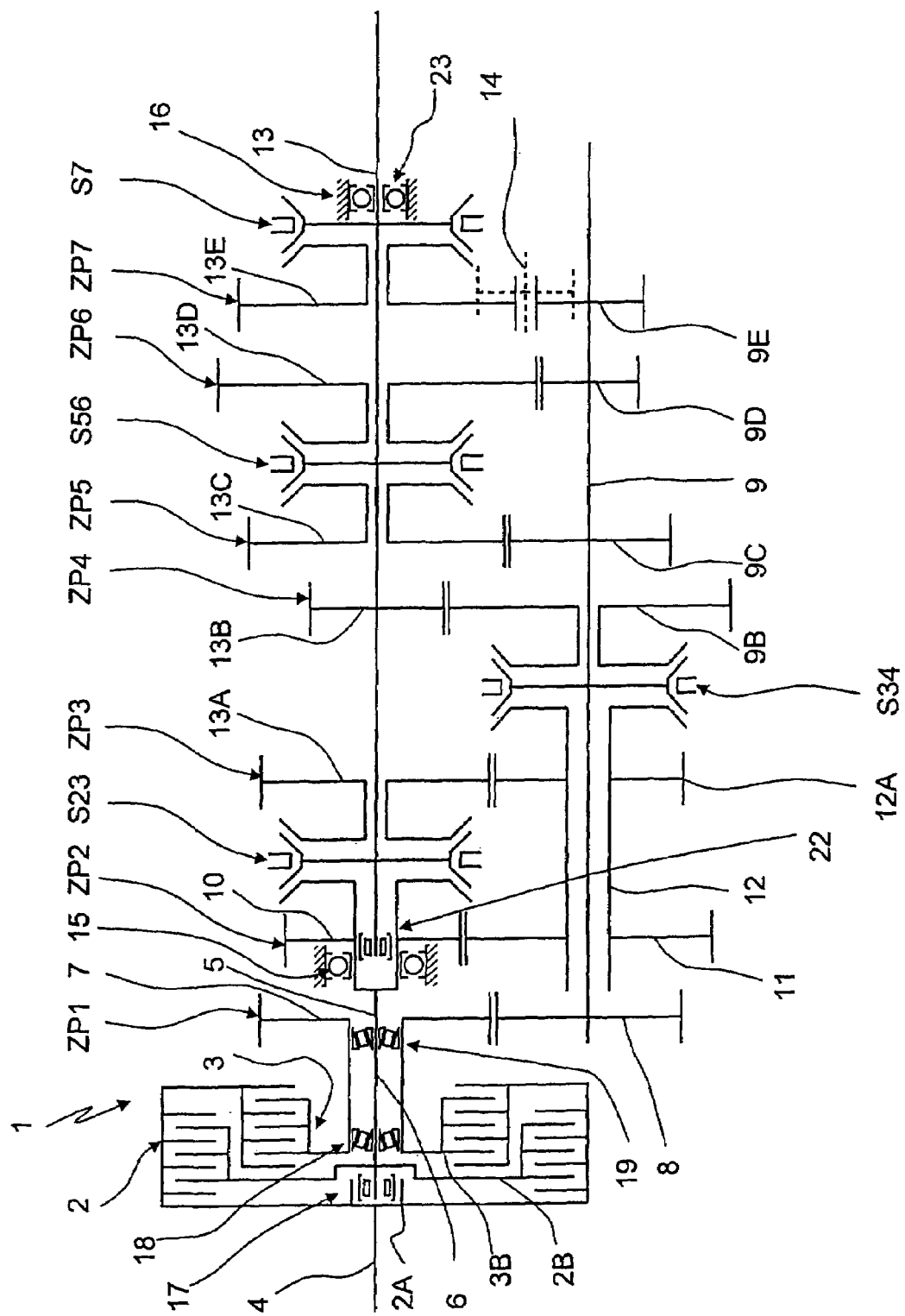
FIG. 3 is a gear diagram of a third embodiment of an inventive transmission device.

In FIG. 3 is shown another embodiment of the inventively designed transmission device which differs from the embodiments shown in FIG. 1 and FIG. 2. In this transmission device 1, the first bearing device 15 is designed as a fixed bearing, the second bearing device 17 as an idler bearing, and the third bearing device 18 and the fourth bearing device 19, respectively, as so-called helical bearings, which can absorb both radial forces and axial forces acting in a defined direction. Since the embodiments shown in FIG. 1 and FIG. 2 only in the area of the bearings of the transmission hollow shaft 6, in the description of FIG. 3 that follows, only the differences are in essence explained in detail.

The third bearing device 18 is here designed as a taper roller bearing and both radial forces and axial forces acting in direction of the transmission input can be supported via the third bearing device 18 on the transmission input central shaft 5. The fourth bearing device 19 is, likewise, built as a helical bearing designed as a taper roller bearing and in the operation of the transmission device 1 supports both radial forces and axial forces engaging in direction of the transmission output on the transmission input hollow shaft 6 upon the transmission input central shaft 5 and thus in the housing 16 of the multi-gear transmission 1.

The third bearing device 18 and the fourth bearing device 19 are mounted in the multi-gear transmission 1, shown in FIG. 3, in a so-called O-arrangement and in this combination alternately supports the axial forces differently oriented an engaging on the transmission input hollow shaft 6 depending on the current loading on the transmission input central shaft 5. It is obviously at the expert's discretion to use the third bearing device 18 and the fourth bearing device 19 in a so-called X-arrangement depending on the application existing at the moment.

Furthermore, it is absolutely possible, depending on the application at the moment, to design the third bearing device 18 and the fourth bearing device 19, differing from the design as a taper roller bearing, as helical ball bearings or the like to make meeting the requirements placed on the bearing device possible.

In all three embodiments of the inventive multi-gear transmission 1 shown in the drawings, it is advantageously possible to dispose the first bearing device 15 and one fixed bearing 24 of the hollow shaft 12 of the countershaft in the manner shown in detail in FIG. 1, in a common bearing plane whereby considerable advantages result in the structure of the housing 16 of the multi-gear transmission 1, since the first bearing device 15 and the fixed bearing 24 of the hollow shaft 12 of the countershaft can be situated in a common bearing plate 25. The fixed bearing 24 of the hollow shaft 12 of the countershaft is situated between the first gear wheel pair ZP1 and the second gear wheel pair ZP2 directly on the hollow shaft 12 of the countershaft at reasonable cost and preferably designed as a grooved ball bearing or the like.

REFERENCE NUMERALS

1 transmission device, multi-gear transmission
2 first powershift element
2A clutch shaft
2B inner disc carrier of the first powershift element
3 second powershift element
3B inner disc carrier of the second powershift element
4 motor output shaft
5 transmission input central shaft
6 transmission input hollow shaft
7 first gear wheel
8 second gear wheel
9 countershaft central shaft
9B to 9E gear wheels of the countershaft central shaft
10 third gear wheel
11 fourth gear wheel
12 countershaft hollow shaft
12A gear wheel
13 transmission output shaft
13A to 13E gear wheels of the transmission output shaft
14 additional gear wheel
15 first bearing device
16 housing of the multi-gear transmission
17 second bearing device
18 third bearing device
19 fourth bearing device
20 first axial bearing device
21 second axial bearing device
22 idler bearing of the transmission output shaft
23 fixed bearing of the transmission output shaft
24 fixed bearing of the countershaft hollow shaft
25 bearing plate
S23, S34
S56, S7 synchronizer unit
ZP1 to ZP7 gear wheel pair

The invention claimed is:
1. A transmission device (1), of a countershaft design, having one input central shaft (5) and one input hollow shaft (6) disposed concentrically thereto and two powershift elements (2, 3), wherein one half of the shifting elements (2, 3) is operatively connected with a drive unit and a second half of the shifting elements (2, 3) is connected with the input central shaft (5) or the input hollow shaft (6) and wherein the input central shaft (5), the input hollow shaft (6) and countershafts (9, 12) are supported in a housing (16) and operatively connected with gear wheels (7, 8, 9B to 9E, 10, 11, 12A, 13A to 13E) which are engagable as gear wheel pairs (ZP1 to ZP7) that can be connected and disconnected for producing a transmission total ratio in the power flow, the input central shaft (5) is directly supported in the housing (16) in the area of its end remote from the drive unit, via a first bearing device (15), and in the area of its second end facing the drive unit, via a second bearing device (17) on a shaft (2A, 4) operatively connected with the drive unit, the input hollow shaft (6) being supported upon the input central shaft (5) via a third bearing device (18) and a fourth bearing device (19).

2. The transmission device according to claim 1, where the first bearing device (15) and the fourth bearing device (19) are fixed bearings and the second bearing device (17) and the third bearing device (18) are idler bearings.

3. The transmission device according to claim 1, wherein the first bearing device (15) is a fixed bearing and the second bearing device (17), the third bearing device (18) and the fourth bearing device (19) are each an idler bearing.

4. The transmission device according to claim 3, wherein the input hollow shaft (6) is additionally supported, in an axial direction of the input central shaft (5), via two axial bearing devices (20, 21).

5. Transmission device according to claim 3, wherein the input hollow shaft (6) is additionally supported, in an axial direction of the housing, via two axial bearing devices (20, 21).

6. The transmission device according to claim 1, wherein the first bearing device (15) is a fixed bearing, the second bearing device (17) is an idler bearing and the third bearing device (18) and the fourth bearing device (19) are each a bearing supporting loads acting in a radial direction and in a defined axial direction.

7. The transmission device according to claim 6, wherein the fourth bearing device (19) is designed so that the axial forces acting in direction of the end of the input central shaft (5) directly supported in the housing (16), can be supported via the first bearing device (15) in the housing (16).

8. The transmission device according to claim 6, wherein the third bearing device (18) is designed so that the axial forces acting in direction of the end of the input central shaft (5), supported on the motor output shaft (4), can be supported in the housing (16) via the first bearing device (15).

9. The transmission device according to any one of claim 1, wherein the input central shaft (5) is operatively connected, via a first gear wheel pair (ZP2), directly with a hollow shaft (12) of the countershaft and the input hollow shaft (6) is operatively connected, via a second gear wheel pair (ZP1), directly with a central shaft (9) of the countershaft.

10. The transmission device according to claim 1, wherein the output shaft (13) is situated coaxially with the input central shaft and the input hollow shaft (5, 6).

11. A dual clutch transmission device (1) of countershaft type comprising:
   an input central shaft (5) and an input hollow shaft (6) and two powershift elements (2, 3), and the input central shaft (5) and the input hollow shaft (6) being concentric with each other;
   a drive unit being operatively connected to a first half of the shifting elements (2, 3), a second half of the shifting elements (2, 3) being connected with one of the input central shaft (5) or the Input hollow shaft (6);
   the input central shaft (5), the input hollow shaft (6) and countershafts (9, 12) are supported in a housing (16) and operatively connected with gear wheels (7, 8, 9B to 9E, 10, 11, 12A, 13A to 13E);
   the gear wheels (7, 8, 9B to 9E, 10, 11, 12A, 13A to 13E) are combined to form gear wheel pairs (ZP1 to ZP7) which are connectable and disconnectable to produce a transmission total ratio in a power flow;
   the input central shaft (5)is directly supported on a shaft (2A, 4) by a first bearing device (15) in a housing (16) at a first areas, remote from a drive unit, and by a second bearing device (17) at a second area facing the drive unit and on a shaft (2A, 4) operatively connected with the drive unit; and
   the input hollow shaft (6) is supported on the input central shaft (5) by a third bearing device (18) and a fourth bearing device (19).

\* \* \* \* \*